US011983927B1

(12) United States Patent
Peruzzi et al.

(10) Patent No.: US 11,983,927 B1
(45) Date of Patent: May 14, 2024

(54) METHODS AND APPARATUS TO PRODUCE ANAOMALOUS VIDEO HIGHLIGHTS

(71) Applicant: Verkada Inc., San Mateo, CA (US)

(72) Inventors: John Peruzzi, San Francisco, CA (US); Song Cao, Foster City, CA (US); Rishabh Goyal, San Mateo, CA (US); Yunchao Gong, Los Altos, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/182,922

(22) Filed: Mar. 13, 2023

(51) Int. Cl.
*G06V 20/40* (2022.01)
*G06V 10/771* (2022.01)

(52) U.S. Cl.
CPC ............ *G06V 20/47* (2022.01); *G06V 10/771* (2022.01)

(58) Field of Classification Search
CPC .............................. G06V 20/47; G06V 10/771
See application file for complete search history.

(56) References Cited

U.S. PATENT DOCUMENTS

| | | | | |
|---|---|---|---|---|
| 2013/0111051 | A1* | 5/2013 | Yaron | H04N 21/47202 709/231 |
| 2020/0143844 | A1* | 5/2020 | Lawlor | G06F 18/10 |
| 2020/0327313 | A1* | 10/2020 | Kedarisetti | G06V 20/40 |
| 2021/0350116 | A1* | 11/2021 | Shixing | G06F 16/587 |

OTHER PUBLICATIONS

Ata-Ur-Rehman, et al. "Anomaly Detection With Particle Filtering for Online Video Surveillance," IEEE Access, Feb. 2, 2021, 9(2021):19457-19468.
Chalapathy and Chawla, "Deep Learning Anomaly Detection: A Survey," arXiv:1901.03407v2 [cs.LG], Jan. 23, 2019, 1-50.
Doshi and Yilmaz, "Continual Learning for Anomaly Detection in Surveillance Videos," Proceedings of the IEEE/CVF Conference on Computer Vision and Pattern Recognition (CVPR) Workshops, 2020, 1-10.
Du et al. "Lifelong Anomaly Detection Through Unlearning," CCS '19: Proceedings of the 2019 ACM SIGSAC Conference on Computer and Communications Security, Nov. 11-15, 2019, 1283-1297.
Georgescu, et al. "Anomaly Detection in Video via Self-Supervised and Multi-Task Learning," Proceedings of the IEEE/CVF Conference on Computer Vision and Pattern Recognition (CVPR), Sep. 10, 2021, 15 pages.

(Continued)

*Primary Examiner* — Girumsew Wendmagegn
(74) *Attorney, Agent, or Firm* — COOLEY LLP

(57) ABSTRACT

A method includes receiving, at a processor and from a requestor compute device, a request including a representation of at least one video camera from a set of video cameras. In response to receiving the request, a set of at least one video file is generated by retrieving a set of video clips associated with the at least one video camera and the time range. For each of the at least one video camera, a subset of video clips is selected from the set of video clips for that video camera based on a comparison of anomaly scores for that video camera, and concatenating the subsets of video clips to generate the set of at least one video file. The method also includes sending a signal to cause display of at least one video file from the set of at least one video file via the requestor compute device.

18 Claims, 8 Drawing Sheets

(56) References Cited

OTHER PUBLICATIONS

Gong et al. "Memorizing Normality to Detect Anomaly: Memory-augmented Deep Autoencoder for Unsupervised Anomaly Detection," Proceedings of the IEEE/CVF International Conference on Computer Vision (ICCV), 2019, 1705-1714.
Koizumi et al. "Unsupervised Detection of Anomalous Sound based on Deep Learning and the Neyman-Pearson Lemma," IEEE/ACM Transactions on Audio, Speech, and Language Processing, Oct. 21, 2018, 13 pages.
Markovitz et al. "Graph Embedded Pose Clustering for Anomaly Detection," Proceedings of the IEEE/CVF Conference on Computer Vision and Pattern Recognition (CVPR), Apr. 10, 2020, 20 pages.
Papers for Video Anomaly Detection, released codes collection, Performance Comparison. Retrieved from the internet at https://github.com/fjchange/awesome-video-anomaly-detection, on Sep. 1, 2022, 14 pages.
Park et al. "Learning Memory-guided Normality for Anomaly Detection," Proceedings of the IEEE/CVF Conference on Computer Vision and Pattern Recognition (CVPR), Mar. 30, 2020, 10 pages.
SUAREZ and Naval, Jr. "A Survey on Deep Learning Techniques for Video Anomaly Detection," arXiv:2009.14146v1 [cs.CV], Sep. 29, 2020, 1-21.
Tan, et al. "Fast Anomaly Detection in Traffic Surveillance Video Based on Robust Sparse Optical Flow," 2016 IEEE International Conference on Acoustics, Speech and Signal Processing (ICASSP), Shanghai, China, 2016, 1976-1980.
Weston et al., "Memory Networks," arXiv:1410.3916v11 [cs.AI], Nov. 29, 2015, 1-15.

\* cited by examiner

METHODS AND APPARATUS TO PRODUCE ANAOMALOUS VIDEO HIGHLIGHTS

FIELD

The present disclosure generally relates to video surveillance, and more specifically, to systems and methods for generating and displaying sets of anomalous video clips.

BACKGROUND

Video surveillance systems often include multiple video cameras and generate large volumes of video data that can be prohibitively time consuming for manual review (e.g., to identify anomalous activity). Thus, a need exists for improved methods and apparatus to review video data.

SUMMARY

In some embodiments, a non-transitory, processor-readable medium stores instructions to cause a processor to receive, from a requestor compute device, a request including a representation of at least one video camera from a plurality of video cameras. The processor-readable medium also stores instructions to cause the processor to generate a set of at least one video file (e.g., at least one video compilation file, or "anomalous video highlights"), in response to receiving the request, by (1) retrieving a set of video clips associated with the at least one video camera from the plurality of video cameras and the time range, (2) selecting, for each video camera from the at least one video camera, a subset of video clips from the set of video clips for that video camera based on a comparison of anomaly scores from a plurality of anomaly scores for that video camera, and (3) concatenating the subsets of video clips to generate the set of at least one video file. The processor-readable medium also stores instructions to send a signal to cause display of at least one video file from the set of at least one video file via the requestor compute device. The display of the at least one video file from the set of at least one video file can include continuous/uninterrupted back-to-back playback thereof, or can include sequential playback with pauses therebetween (e.g., advancing to a next video file in response to a user engagement with a displayed prompt to proceed). Each video file can include a video clip or a plurality of video clips.

In some embodiments, a method for producing anomalous video highlights includes identifying, for each video camera from a plurality of video cameras, a representation of a set of feature vectors from a plurality of sets of feature vectors and associated with a first time period. The method also includes calculating, for each video camera from the plurality of video cameras and based on the associated representation of the set of feature vectors from the plurality of sets of feature vectors for that video camera, at least one anomaly score from a plurality of anomaly scores. The method also includes receiving, from a requestor compute device and subsequent to the first time period, a request including (1) a representation of at least one video camera from the plurality of video cameras and (2) a representation of a time range within the first time period. In response to receiving the request, a set of at least one video file is generated by (1) retrieving a set of video clips associated with the at least one video camera and the time range, (2) selecting, for each video camera from the at least one video camera, a subset of video clips from the set of video clips for that video camera based on a comparison of the anomaly scores from the plurality of anomaly scores for that video camera, and (3) concatenating the subsets of video clips to generate the set of at least one video file. The method also includes sending a signal to cause display of at least one video file from the set of at least one video file via the requestor compute device.

In some embodiments, an apparatus for producing anomalous video highlights includes a processor and a memory operably coupled to the processor. The memory stores instructions to cause the processor to identify, for each video camera from a plurality of video cameras, a representation of a set of feature vectors from a plurality of sets of feature vectors and associated with a first time period. The memory also stores instructions to cause the processor to identify, for each set of feature vectors from the plurality of sets of feature vectors, a representation of an associated time within the first time period. The memory also stores instructions to cause the processor to calculate, for each video camera from the plurality of video cameras and based on the representation of the set of feature vectors from the plurality of sets of feature vectors for that video camera, at least one anomaly score from a plurality of anomaly scores. The memory also stores instructions to cause the processor to receive, from a requestor compute device and subsequent to the first time period, a request including (1) a representation of at least one video camera from the plurality of video cameras and (2) a representation of a time range within the first time period. The memory also stores instructions to cause the processor to generate, in response to receiving the request, a set of at least one video file by (1) retrieving a set of video clips associated with the at least one video camera and the time range, (2) selecting, for each video camera from the at least one video camera, a subset of video clips from the set of video clips for that video camera based on a comparison of the at least anomaly score from the plurality of anomaly scores for that video camera, and (3) concatenating the subset of video clips to generate the set of at least one video file. The memory also stores instructions to cause the processor to send a signal to cause display of at least one video file from the set of at least one video file via the requestor compute device.

DETAILED DESCRIPTION

Figure 1A:
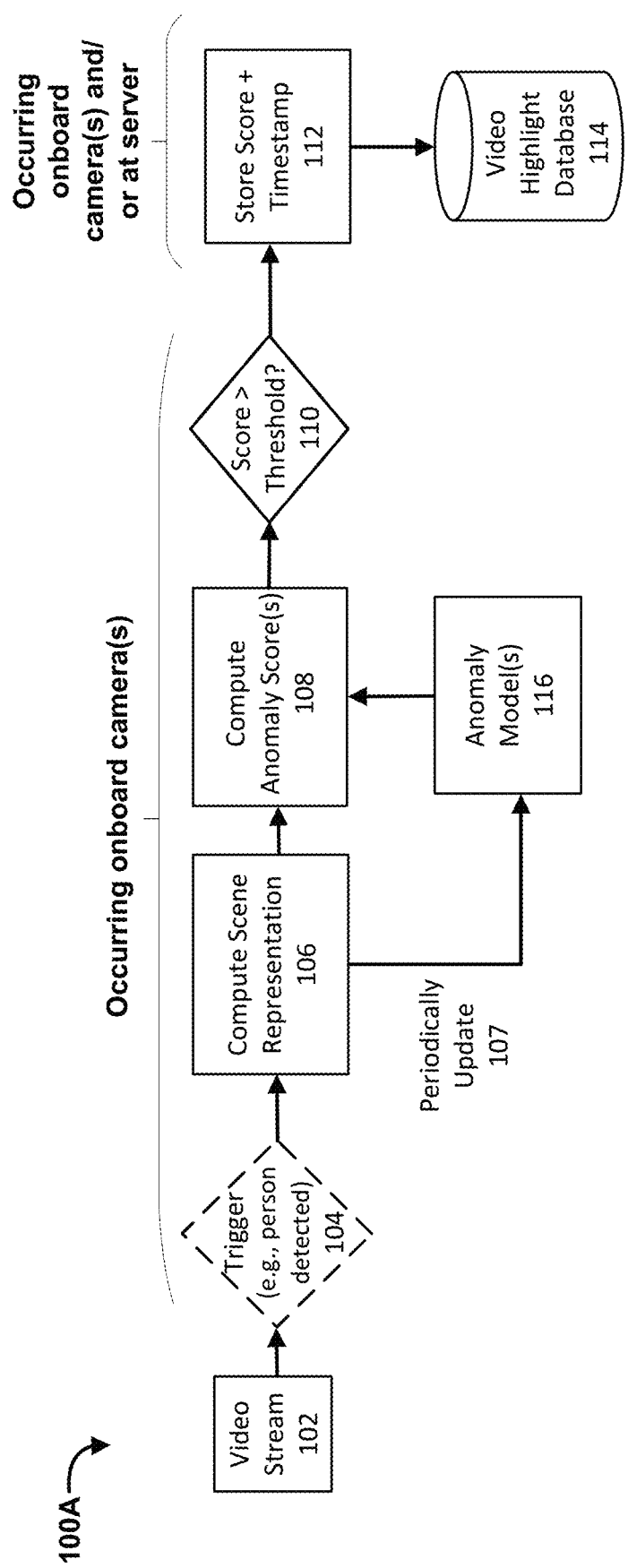
FIG. 1A is a flow diagram showing a method for video highlight identification and storage, according to some embodiments.

Some embodiments set forth herein include the generation and playback of video highlights/clips generated using a multi-camera security system (also referred to as a surveillance system). The video highlights/clips can include video footage that has been identified/detected as being anomalous or unusual, and can include video footage from one or multiple cameras. The video highlights/clips can be stored and/or transmitted in a single file, a combined file, or as separate files. The playback can be performed on one or more compute devices, optionally in response to a user request that specifies one or more video cameras and/or one or more time periods. Optionally, the request can also include a representation of a type or types of anomalous activity of interest.

In some embodiments, one or more video cameras from a plurality of video cameras of a video surveillance system stores a representation of "normal" activity/behavior, which may be the same or may differ among the plurality of video cameras. During operation, video footage is streamed and/or recorded by each video camera from the one or more video cameras, and events are detected within the video footage. The detected events can then be scored, e.g., on a per-camera basis and/or based on a comparison between data associated with the detected events and the representation(s) of normal activity (e.g., a deviation of the detected events from normal activity). In other words, anomaly scores can be assigned to each detected event and/or associated video clip or segment of the video footage. In some implementations, the representation(s) of normal activity are modified over time, for example in response to and/or based on scene changes associated with the one or more video cameras. For example, if a new street sign is installed at a corner/intersection, the street sign may initially be detected as anomalous, but over time is automatically recognized by the multi-camera security system as being normally associated with the scene.

A set of video highlights (e.g., each including a representation of one or more of the detected events, optionally having an associated anomaly score that exceeds or is below a predefined threshold value) can be generated for subsequent display to one or more users. The generation of the set of video highlights can occur automatically, for example in response to a particular type of event detected, in response to a particular anomaly score or set of anomaly scores being detected, and/or according to a predefined frequency or schedule. Alternatively or in addition, the generation of the set of video highlights can be in response to a user request. The user request can specify one or more of: one or more video cameras, priority values for the one or more video cameras, one or more geographic regions, one or more time periods, one or more types of anomalous behavior of interest, a number of video highlights desired for display, a user-defined duration of a series of highlights to be displayed, one or more compute devices on which payback of the video highlights is to be displayed (e.g., via a user interface, such as a graphical user interface (GUI) thereof), etc.

In some embodiments, a method includes concatenating a plurality (e.g., a "top N," where N is an integer) of retrieved video highlights (which may have originated from one video camera or from multiple different video cameras) having a combined duration T (e.g., representing an historical time period from T1 to T2), such that they will be displayed chronologically in a continuous playback (unless the user pauses the playback) that can be completed by a user within the time period T. Optionally, a transition screen/display can be inserted between concatenated video highlights. The video highlights can be displayed in a uniform format or in a format that varies over time. The format(s) can include, for example, an array of thumbnails, a page of thumbnails (e.g., on a timeline, etc.), a highlight reel, etc. In some implementations, a speed of playback of the video highlights may be adjusted based on an anomalousness of each frame (e.g., a video clip playback speed may be slowed down during more anomalous portions of the video clip).

In some embodiments, a set of one or more representations of activity occurring within a scene captured by a video camera are compiled and maintained/stored. The stored activity data can be used by the multi-camera security system to automatically "learn" (e.g., via machine learning) definitions of normal human (or non-human) activity for a given video camera, region, or scene(s). The set of one or more representations of activity can include one or more of the following features: person motion (e.g., generated via optical flow—a computer vision algorithm for determining pixel differences across frames), optionally with speed, direction, and/or location in the frame, and optionally based on a tunable parameter such as a clip window duration (e.g., about 10-20 seconds); person pose(s); image representation(s) (e.g., an image embedded to a lower dimensional vector); time of day; and/or any other set of one or more features of interest (optionally in an embedded space) that are derived from an image frame and/or video clip information/data.

In some embodiments, the one or more features are stored explicitly, for example as historical feature vectors, optionally as comparison examples for use in anomaly detection. The anomaly detection can be performed, at least in part, using a k-Nearest Neighbors (KNN) machine learning algorithm. KNN is an anomaly detection algorithm that can directly compare new examples/data to historical examples/data that, for example, are stored as vectors. Alternatively or in addition, the one or more features (and/or other associated historical data) can be stored implicitly (e.g., using a K-means approach, which stores and updates a set of mean features) and/or as a representation of one or more historical observations.

In some embodiments, one or more representations of historical data (e.g., sets of vectors, one or more mean values, and/or one or more statistical models of past events) form a portion of an anomaly model, and the anomaly model also includes a protocol (algorithm(s)/code, such as KNN) that determines an anomaly score based on the one or more representations of historical data and at least one new example/data. For example, in one implementation, an anomaly model may include one or more sets of vectors as the one or more representations of historical data, and KNN as the protocol, while in another implementation, an anomaly model may include one or more sets of running means as the one or more representations of historical data, and a K-means anomaly algorithm as the protocol. Optionally, the same protocol may be used to generate the original one or more representations of historical data and/or to update the one or more representations of historical data based on the anomaly score. Representations of historical data may be stored in a manner that is specific to/associated with a particular dataset or dataset type.

In some embodiments, one or more anomaly detection algorithms are used to compare a current or selected video frame, clip, or scene, with a maintained/stored representation of normality associated with that scene, video camera, field of view, etc., and to determine an anomaly score based on the comparison (e.g., based on difference data), for example using KNN and/or any other suitable anomaly detection machine learning algorithm. Anomaly scores can be generated, stored and/or reported on a per-camera basis, e.g., according to a predefined schedule or frequency.

In some implementations, a set of feature vectors is stored, and a KNN algorithm operates on the set of feature vectors to calculate anomaly scores. In other implementations, summary data (e.g., a running mean) may be stored and used to calculate anomaly scores without the use of the KNN algorithm.

In some embodiments, a system for generating and displaying anomalous video highlights is configured to adjust to scene changes over time. For example, as a machine learning model improves/evolves over time (e.g., using additional training data and/or loss functions), newer information/data can eventually become more important to the system than old information. This evolution can be implemented within the system, for example, by storing the time/date data associated with older examples (e.g., of videos, video highlights, etc.), eventually deleting the older examples based on the time/date data (e.g., in response to a memory size limit being reached), and accepting/storing newer examples. In other implementations, an update procedure can be performed, in which the "normality" model is adjusted in a way that either explicitly or implicitly prioritizes the newer information (e.g., more recent feature vectors) as part of an update procedure, or without taking the age of the newer information (e.g., the age of the more recent vectors) into account. As an example of an implicit method, a standard "running mean" update procedure can be performed in which newer examples impact the running mean more than older examples (and, optionally, older examples are removed/ignored).

In some embodiments, video highlight compilations are generated based on one or more comparisons of footage across multiple video cameras (e.g., based on associated anomaly scores). An algorithm for generating the video highlight compilations can return a set of video clips based on a specified set of cameras, a requested time range over which to search, and a requested amount or duration of highlights. In some implementations a maximum number of highlights per camera is included in the highlight compilation(s), relative to the request size, such that one video camera doesn't saturate/dominate the highlight compilation. Alternatively or in addition, the video highlight compilation(s) can be "streamed" to one or more compute devices, for display thereon, and/or delivered thereto as part of a data "feed."

In some embodiments, video highlight compilations are not generated based on one or more comparisons of footage across multiple video cameras, and instead, an equal amount of top video highlights is returned from each video camera, e.g., over a requested time range, or the highest scored video highlights are returned for each video camera, irrespective of how many qualifying anomaly scores are assigned to each video camera. In some implementations, the video highlight compilations are further generated based on one or more user-specified camera importances, which can be used to weight video highlight importance(s). In such implementations, if there is only one camera, this step may include returning the top video highlights over the time range.

FIG. 1A is a flow diagram showing a method for video highlight identification and storage, according to an embodiment(s). As shown in FIG. 1A, the method 100A includes receiving a video stream 102, and computing a scene representation at 106 (optionally triggered by detecting a person within the video stream 102 at 104, in which instances, fewer numbers of video frames may need to be processed). The scene representation at 106 can include one or more vectors, for example representing location, time, and/or speed, optionally restricted to one or more regions of detected activity/people. At 108, one or more anomaly scores are computed (e.g., using a KNN distance determination algorithm based on old vectors and summed over a plurality of video frames), and one or more anomaly models 116 are periodically and/or repeatedly updated, at 107. The periodic updating at 107 can include saving one or more historical vectors and/or deleting oldest vectors in response to determining that a maximum storage volume has been reached or exceeded, and/or the age of the oldest vectors is above a predefined value. In some instances, the anomaly model(s) 116 include one or more sets of older/historical scene representations/vectors. At 110, if it is determined that the anomaly score(s) is above a predefined threshold, the time score and an associated timestamp is stored at 112, e.g., in a video highlight database 114. In some implementations, steps 104, 106, 108, 110, and 116 are performed onboard one or more video cameras, and steps 112 and 114 can be performed onboard the video camera(s) and/or at a server that is remote from the video camera(s).

Figure 1B:
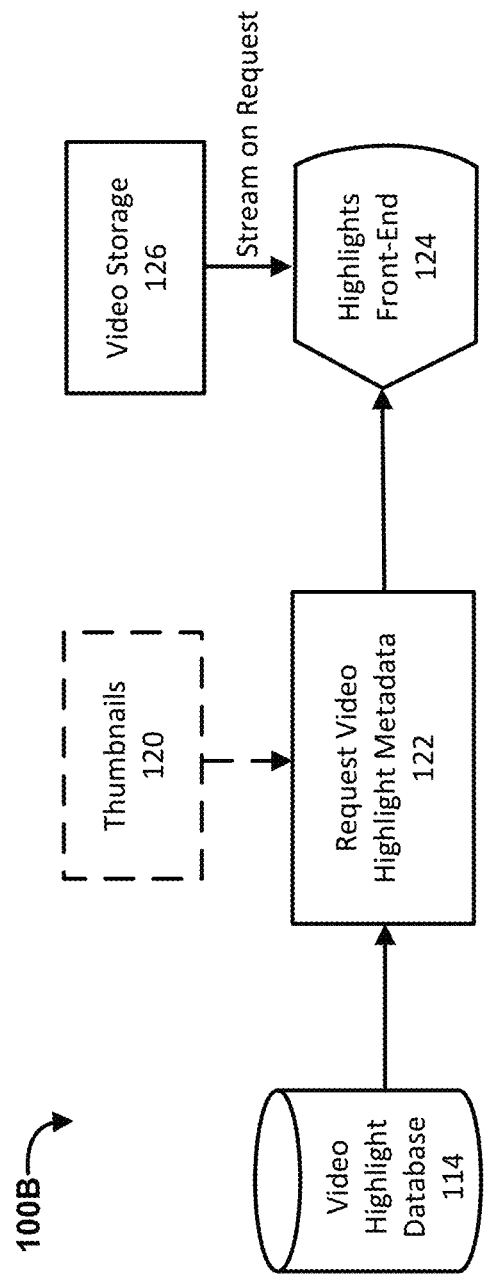
FIG. 1B is a flow diagram showing a method for video highlight retrieval and display, according to some embodiments.

FIG. 1B is a flow diagram showing a method for video highlight retrieval and display, according to some embodiments. As shown in FIG. 1B, the method 100B includes retrieving video highlights from a video highlight database 114, in response to a request at 122 for highlight metadata (e.g., from a user; not shown). The request can be, for example, for the highest-scoring videos for a specified time range and/or set of video cameras. Optionally, one or more thumbnail images 120 are also retrieved in response to the request at 122. The highlight metadata is sent to a highlights "front-end" (e.g., implemented via software and/or hardware of a compute device), and video footage associated with the video highlights metadata can be streamed on request at the highlights front end 124 by retrieving the associated video highlights (based on the video highlights metadata) from video storage 126. The stream can cause continuous playback of a set of anomalous videos associated with or responsive to the request.

Figure 2:
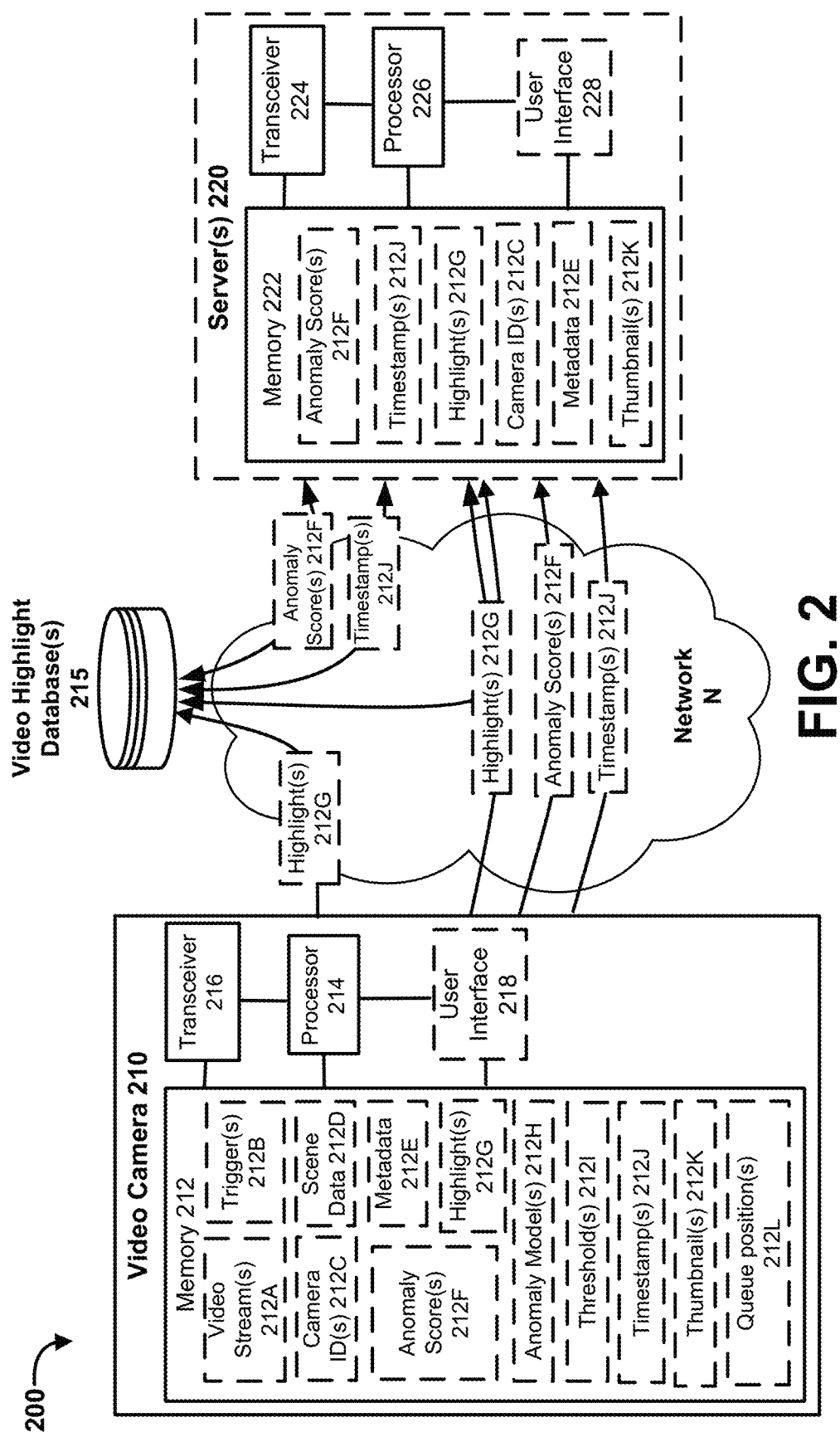
FIG. 2 is a system diagram for a system for video highlight generation and display, according to some embodiments.

FIG. 2 is a system diagram for a system for video highlight generation and display, according to some embodiments. As shown in FIG. 2, the system 200 (e.g., a multi-camera security system as described herein) includes at least one video camera 210, in operable communication via a wireless and/or wired telecommunications network "N" with one or more video highlight databases 215 and/or one or more remote servers 220. Each video camera 210 includes a memory 212 operably coupled to a transceiver 216, a processor 214, and optionally a user interface 218 (e.g., a graphical user interface (GUI), a display panel, etc.). The processor 214 is operably coupled to the transceiver 216 and, if present, the user interface 218. The memory 212 stores one or more of: one or more video streams 212A, one or more triggers 212B, one or more camera identifiers (IDs) 212C, scene data 212D, metadata 212E, one or more anomaly scores 212F, one or more highlights 212G, one or more anomaly models 212H, one or more thresholds 212I, one or more timestamps 212J, one or more thumbnails 212K, and one or more queue positions 212L. The trigger(s) 212B can include predefined/user-defined criteria of interest to trigger the capture of video data (e.g., the one or more video streams 212A) and/or to trigger the generation of a highlight clip (e.g. the one or more highlights 212G), for example specifying a person, an object, an activity, etc. The scene data 212D can include data specifying items related to a scene(s) within the video data, such as (but not limited to) geolocation, location name, lighting conditions, weather conditions, date/time data, security classification, etc. The metadata 212E can include for example data specifying items related to characteristics of the video data, such as (but not limited to) aperture, shutter speed, International Organization for Standardization (ISO) number, focal depth, dots per inch (DPI), etc. The metadata 212E can include for example descriptive metadata, structural metadata, preservation metadata, provenance metadata, and/or administrative metadata. The highlight(s) 212G can include for example video clips/files, optionally stored in association with its metadata 212E. The anomaly model(s) 212H can include, for example, data representing older/historical scene representations/vectors, running means, etc. The threshold(s) 212I can include for example predefined/user-defined threshold values for the anomaly score(s) 212F, for determining whether the highlight(s) 212G should be generated. The thumbnail(s) 212K can include images associated with or taken from the highlight(s) 212G, e.g., for presentation/display via a user interface (which may or may not be the user interface 218 and/or the user interface 228). The thumbnails can serve as a "preview" to a user of a video highlight that will be played in the future (see, e.g., FIG. 3 and related discussion). The queue position(s) 212L can represent/specify an ordering of the thumbnail(s) 212K within a display/user interface.

Each of the server(s) 220 can be a "remote" server, and includes a memory 222 operably coupled to a transceiver 224, a processor 226, and optionally a user interface 228 (e.g., a graphical user interface (GUI), a display panel, etc.). The processor 226 is operably coupled to the transceiver 224 and, if present, the user interface 228. The memory 222 stores one or more of: one or more anomaly scores 212F, one or more timestamps 212J, one or more highlights 212G, one or more camera IDs 212C, metadata 212E, and one or more thumbnails 212K. During operation of the system 200, each of the anomaly score(s) 212F, timestamp(s) 212J, and highlight(s) 212G can be received at the server(s) 220 from the video camera(s) 210 and/or from the video highlight database(s) 215. Each video camera 210 can also generate highlight(s) 212G and send the highlight(s) 212G to the video highlight database(s) 215 for storage thereon (and, optionally, for subsequent distribution to the server(s) 220, e.g., in response to a request for one or more highlights 212G, the request originating, for example from one or more of the servers 220 and/or or one or more user compute devices different from the server(s) 220 (also referred to herein as "requestor compute devices") not shown)). In some such embodiments, information in memory 222 can be forwarded to and/or exchanged between/among the one or more servers 220 and/or the one or more requestor compute devices, via the network N. For example, information can be sent from the server(s) 220 (optionally not having a GUI) to one or multiple requestor compute devices (optionally having a GUI) and associated with an end requestor. Such information can flow/pass through the network N and via one or more of the server(s) 220 prior to reaching the one or multiple requestor compute devices.

In some implementations of the system 200, the anomaly model(s) 212H and/or sets of vectors thereof is stored on the video camera(s) 210, while in other implementations, the anomaly model(s) 212H and/or sets of vectors thereof may be stored off-camera (e.g., in a separate memory device connected directly to video camera 210 and/or connected to video camera 210 via network N), but accessible by the video camera(s) 210 (e.g., on-demand).

Figure 3:
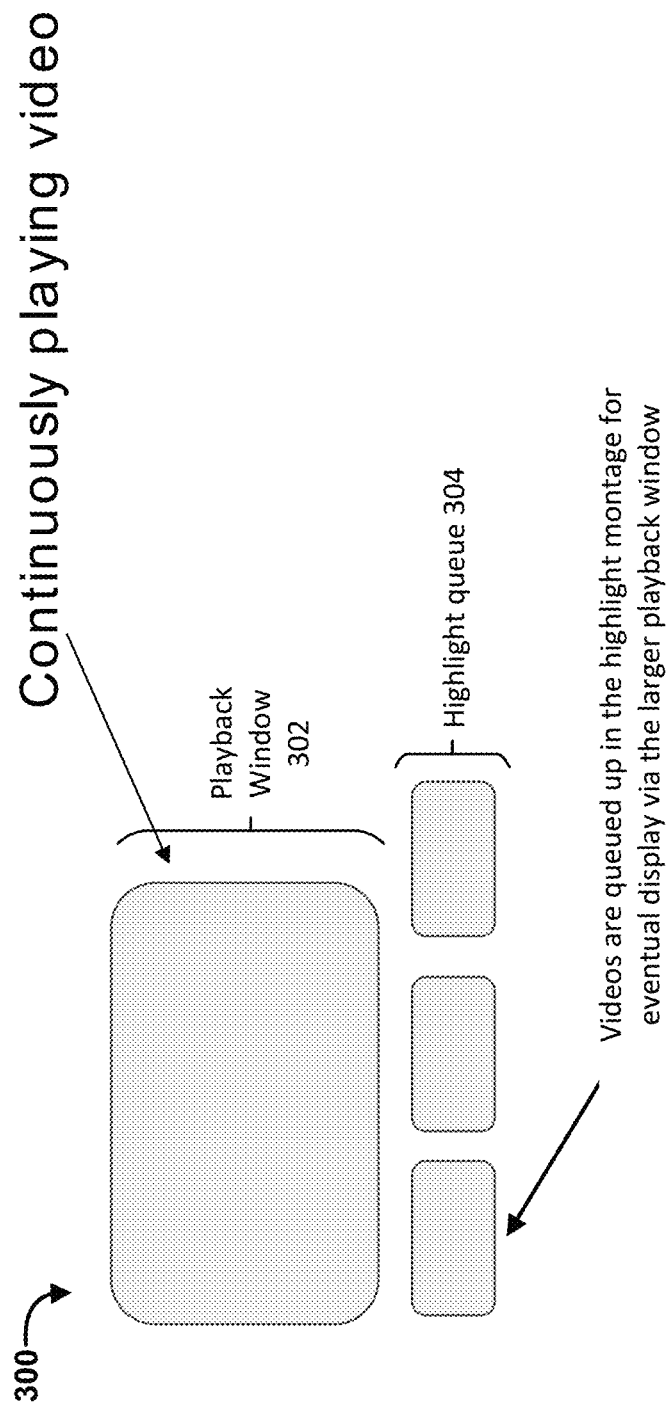
FIG. 3 shows an example user interface of a system for generating and displaying anomalous video highlights, according to some embodiments.

FIG. 3 shows an example user interface of a system for generating and displaying anomalous video highlights, according to some embodiments. The user interface 300 includes a playback window 302 and a highlight queue 304. In the playback window 302, one or more video clips (e.g., the highlight(s) 212G of FIG. 2) are sequentially and continuously played (i.e., from beginning to end without interruption unless paused by a viewer). The highlight queue 304 includes an arrangement of thumbnails (e.g., the thumbnail(s) 212K of FIG. 2) associated with video clips that are to be played next in the sequential display via the playback window 302. For example, once a first video clip that is currently playing in the playback window 302 ends, a next (second) video clip associated with the leftmost thumbnail in the highlight queue 304 is played via the playback window, and the thumbnail for the second video clip may be automatically removed from the highlight queue 304 (optionally with an additional thumbnail being added to the end/rightmost position of the highlight queue 304). Although shown in FIG. 3 as forming a linear array, other arrangements of the highlight queue 304 are also contemplated (e.g., a square grid/array, etc.). In some implementations, a viewer/user can go back (i.e., view a previous video clip of interest) or skip ahead (i.e., view a subsequent video clip of interest) by interacting with the highlight queue 304 via the user interface 300.

Figure 4:
FIG. 4 shows example images of averaged optical flow over two video clips, according to some embodiments.

FIG. 4 shows example images of averaged optical flow over two video clips, according to some embodiments. In the upper left image, a cyclist appears on the far left (location A1), and a representation of the cyclist's motion (e.g., an optical flow) is graphically shown at 402. The optical flow of the upper left image of FIG. 4 represents the motion of the cyclist from location A1 to location A2 shown in the upper right image of FIG. 4. Similarly, the lower left image of FIG. 4 shows a first location B1 of a skateboarder, and representations of the skateboarder's motions (optical flow) are graphically shown at 404, 406, and 408. The optical flow of the lower left image of FIG. 4 represents the motion of the skateboarder from location B1 to location B2 shown in the lower right image of FIG. 4.

Figure 5:
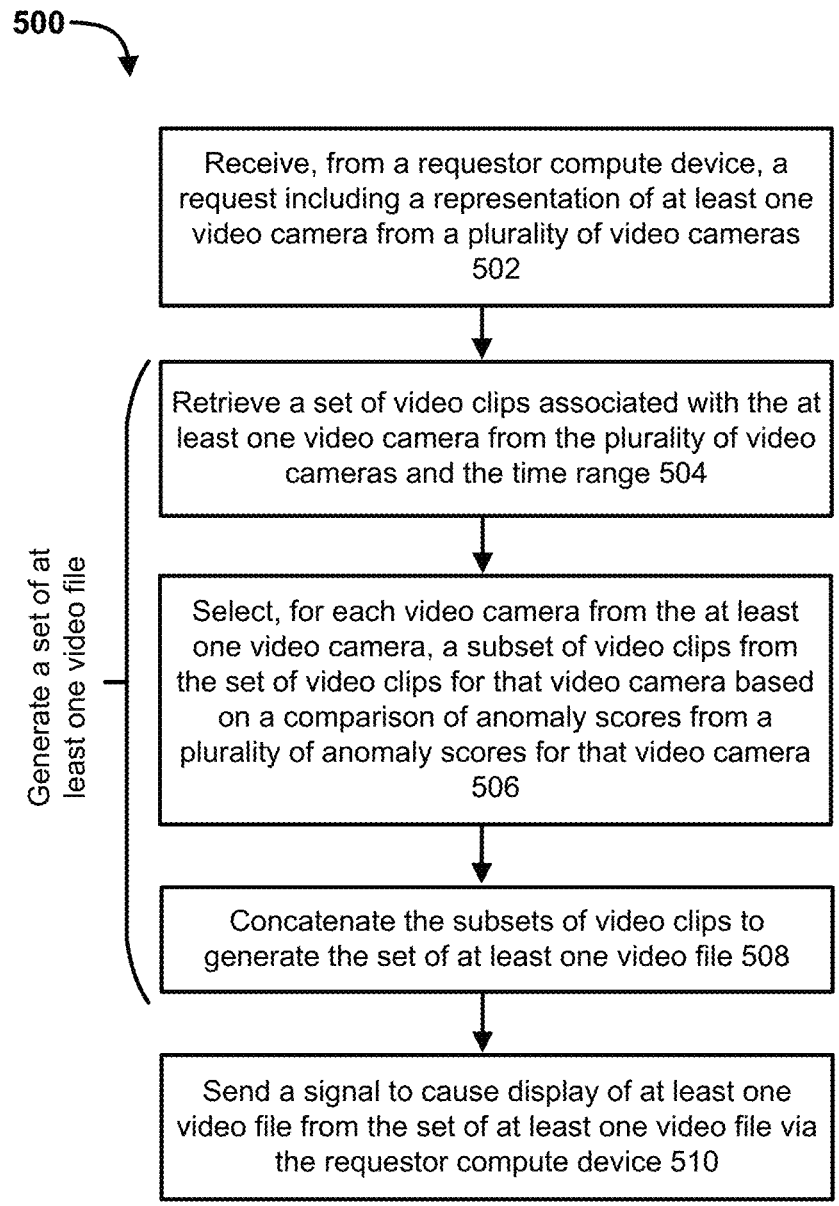
FIG. 5 is a flow diagram showing a first example method for producing anomalous video highlights, according to some embodiments.

FIG. 5 is a flow diagram showing a first example method for producing anomalous video highlights, according to some embodiments. The method of FIG. 5 can be performed, for example, using the system 200 of FIG. 2. Alternatively or in addition, the method 500 may performed by a processor based on instructions stored in a non-transitory, processor-readable medium. As shown in FIG. 5, the method 500 includes receiving, at 502 and from a requestor compute device, a request including a representation of at least one video camera from a plurality of video cameras. A set of at least one video file (e.g., at least one video compilation file, or "anomalous video highlights") is generated, in response to receiving the request, by (1) retrieving a set of video clips associated with the at least one video camera from the plurality of video cameras and the time range (at 504), (2) selecting, for each video camera from the at least one video camera, a subset of video clips from the set of video clips for that video camera based on a comparison of anomaly scores from a plurality of anomaly scores for that video camera (at 506), and (3) concatenating the subsets of video clips to generate the set of at least one video file (at 508). The method 500 also includes sending a signal, at 510, to cause display of at least one video file from the set of at least one video file via the requestor compute device. The display of the at least one video file from the set of at least one video file can include continuous/uninterrupted back-to-back playback thereof, or can include sequential playback with pauses therebetween (e.g., advancing to a next video file in response to a user engagement with a displayed prompt to proceed). Each video file can include a video clip or a plurality of video clips.

In some implementations, the request also includes a representation of a time range within a first time period, and the generation of the set of at least one video file is based on both the representation of at least one video camera from a plurality of video cameras and the representation of the time range within the first time period. The time range may be user-defined and/or may be selected based on a predefined rule (e.g., "past week," "past 24 hours," etc.). The time range may change dynamically/over time. For example, a first request at a first time may have a first associated time range, and a second request at a second time subsequent to the first time may have a second associated time range different from the first associated time range.

In some implementations, the processor-readable medium also stores instructions to cause the processor to calculate, for each video camera from the plurality of video cameras, the plurality of anomaly scores for that video camera based on one of: (1) at least one feature vector generated for that video camera, or (2) a representation of the at least one feature vector.

In some implementations, the processor-readable medium also stores instructions to cause the processor to calculate, for each video camera from the plurality of video cameras, the plurality of anomaly scores for that video camera based on one of: (1) at least one feature vector generated for that video camera or (2) a representation of the at least one feature vector, and using a different anomaly model for that video camera.

In some implementations, the processor-readable medium also stores instructions to cause the processor to calculate, for each video camera from the plurality of video cameras, the plurality of anomaly for that video camera scores using a KNN machine learning algorithm.

In some implementations, the display of the at least one video file from the set of at least one video file includes a playback window and a plurality of thumbnail images.

In some implementations, the request also includes a representation of a desired duration for the set of at least one video file.

Figure 6:
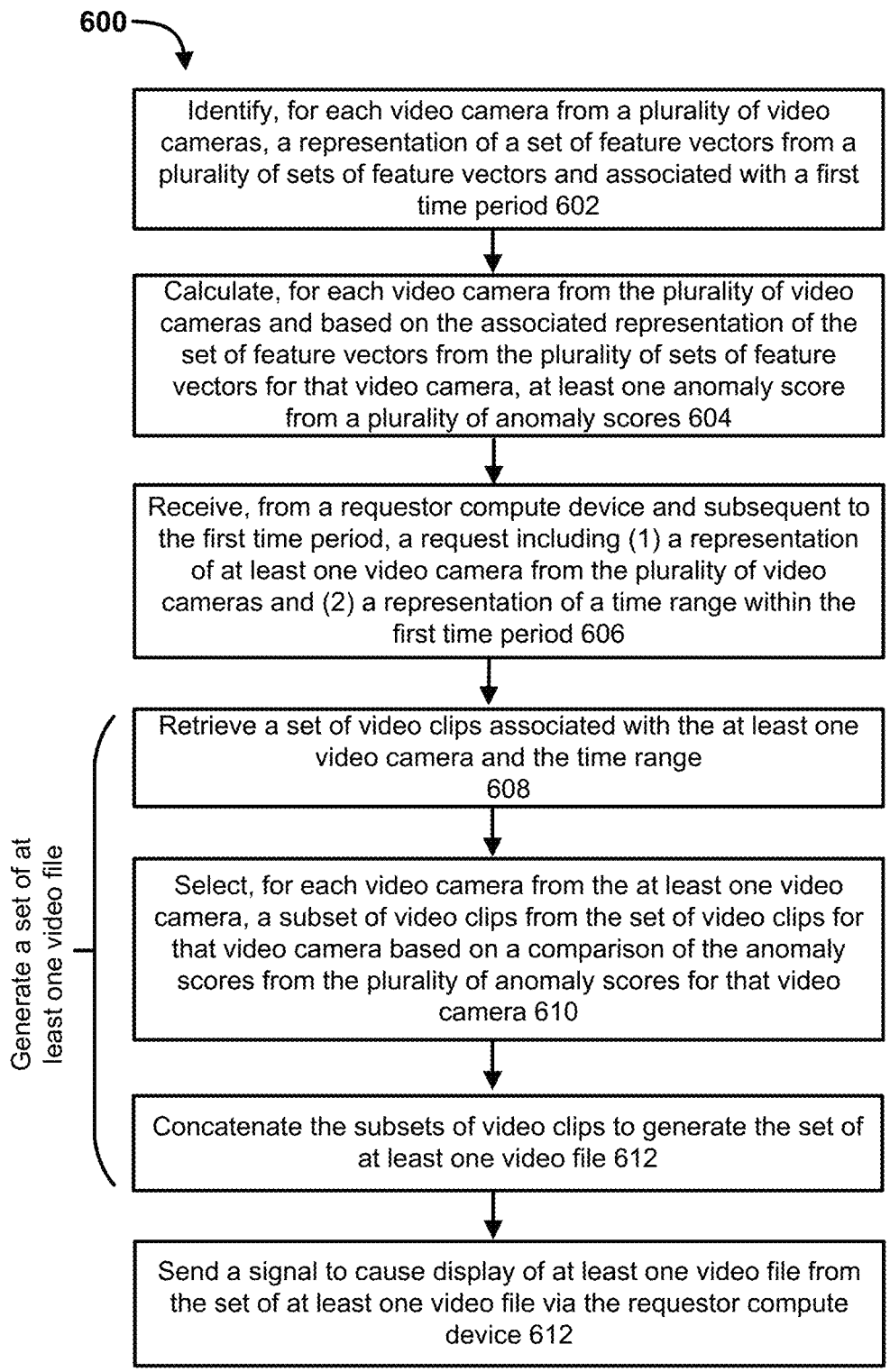
FIG. 6 is a flow diagram showing a second example method for producing anomalous video highlights, according to some embodiments.

FIG. 6 is a flow diagram showing a second example method for producing anomalous video highlights, according to some embodiments. The method of FIG. 6 can be performed, for example, using the system 200 of FIG. 2. As shown in FIG. 6, the method 600 includes identifying, at 602 and for each video camera from a plurality of video cameras, a representation of a set of feature vectors from a plurality of sets of feature vectors and associated with a first time period. The method 600 also includes calculating, at 604 and for each video camera from the plurality of video cameras and based on the associated representation of the set of feature vectors from the plurality of sets of feature vectors for that video camera, at least one anomaly score from a plurality of anomaly scores. The method 600 also includes receiving, at 606 and from a requestor compute device and subsequent to the first time period, a request including (1) a representation of at least one video camera from the plurality of video cameras and (2) a representation of a time range within the first time period. In response to receiving the request, a set of at least one video file is generated by (1) retrieving a set of video clips associated with the at least one video camera and the time range (at 608), (2) selecting, for each video camera from the at least one video camera, a subset of video clips from the set of video clips for that video camera based on a comparison of the anomaly scores from the plurality of anomaly scores for that video camera (at 610), and (3) concatenating the subsets of video clips to generate the set of at least one video file (at 612). In some implementations, each video clip from the set of video clips has an associated duration of at least about 10 seconds, or at least about 20 seconds, or at least about 30 seconds, or between about 10 seconds and about 60 seconds. In some implementations, each video clip is stored and/or transmitted as a distinct file. The method 600 also includes sending a signal, at 612, to cause display of at least one video file from the set of at least one video file via the requestor compute device.

In some implementations, the display of the at least one video file from the set of at least one video file includes a playback window and at least one of a highlight queue or a plurality of thumbnail images. Alternatively or in addition, each feature vector from the plurality of sets of feature vectors can include location data, time data, and speed data, and is associated with a video region in which a moving person has been detected.

In some implementations, each feature vector from the plurality of sets of feature vectors includes location data associated with an optical flow (e.g., for a location where the optical flow occurs), age data associated with the optical flow (e.g., temporal data indicative of when the optical flow occurred), a first coordinate, and a second coordinate substantially orthogonal to the first coordinate. For example, a feature vector can have a format as follows (or similar): [age, location-x, location-y, opcitcalflow-1, opticalflow-2]. Each of the first coordinate and the second coordinate can be generated by averaging the optical flow over a set of at least one video frame. In other words, the first coordinate and/or the second coordinate can represent a directionality of an associated pixel motion.

Figure 7:
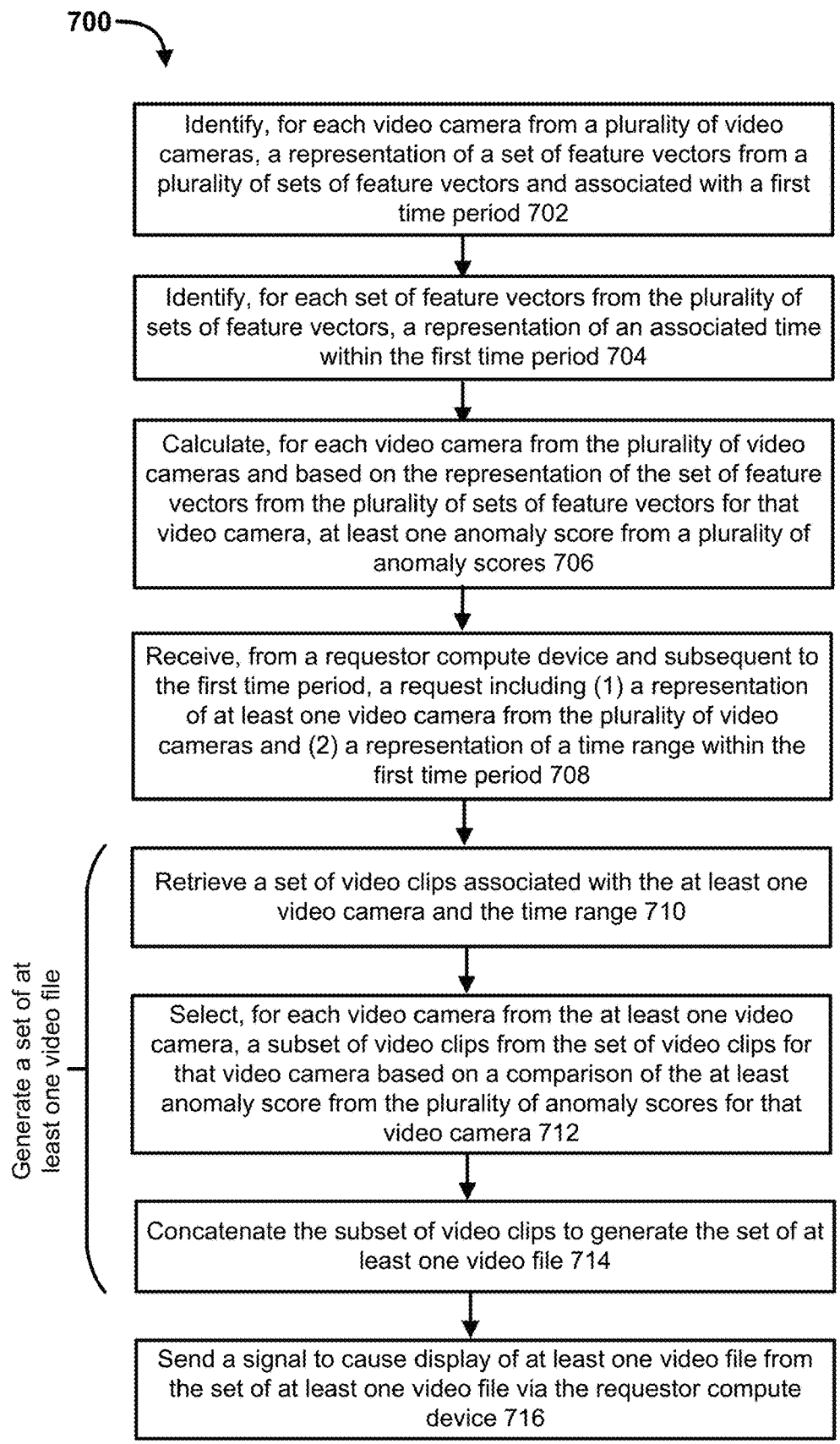
FIG. 7 is a flow diagram showing a third example method for producing anomalous video highlights, according to some embodiments.

FIG. 7 is a flow diagram showing a third example method for producing anomalous video highlights, according to some embodiments. The method of FIG. 7 can be performed, for example, using the system 200 of FIG. 2. Alternatively or in addition, the method 700 may performed by an apparatus for producing anomalous video highlights, the apparatus including a processor and a memory operably coupled to the processor. As shown in FIG. 7, the method 700 includes identifying, at 702 and for each video camera from a plurality of video cameras, a representation of a set of feature vectors from a plurality of sets of feature vectors and associated with a first time period. At 704, a representation of an associated time within the first time period is identified for each set of feature vectors from the plurality of sets of feature vectors. At least one anomaly score from a plurality of anomaly scores is calculated, at 706, for each video camera from the plurality of video cameras and based on the representation of the set of feature vectors from the plurality of sets of feature vectors for that video camera. At 708, a request is received from a requestor compute device and subsequent to the first time period. The request includes (1) a representation of at least one video camera from the plurality of video cameras and (2) a representation of a time range within the first time period. A set of at least one video file is generated, in response to receiving the request, by (1) retrieving a set of video clips associated with the at least one video camera and the time range (at 710), (2) selecting, for each video camera from the at least one video camera, a subset of video clips from the set of video clips for that video camera based on a comparison of the at least anomaly score from the plurality of anomaly scores for that video camera (at 712), and (3) concatenating the subset of video clips to generate the set of at least one video file (at 714). In some implementations, each video clip from the set of video clips has an associated duration of at least about 20 seconds. The method 700 also includes sending a signal, at 716, to cause display of at least one video file from the set of at least one video file via the requestor compute device.

In some implementations, the request also includes a representation of a desired duration for the at least one video file from the set of at least one video file. Alternatively or in addition, the method 700 can also include updating the plurality of sets of feature vectors during a second time period subsequent to the first time period, by one of removing at least one feature vector from the plurality of sets of feature vectors or reducing a weight associated with at least one feature vector from the plurality of sets of feature vectors (i.e., down-weighting or reducing a weighting thereof), based on an age of the at least one feature vector from the set of feature vectors.

In some implementations, the method also includes updating the plurality of sets of feature vectors during a second time period subsequent to the first time period, by removing at least one feature vector from the plurality of sets of feature vectors in response to detecting that a memory size limit of information has been reached.

In some implementations, each feature vector from the plurality of sets of feature vectors includes location data, time data, and speed data, and is associated with a video region in which a moving person has been detected.

In some implementations, each feature vector from the plurality of sets of feature vectors includes location data associated with an optical flow, age data associated with the optical flow, a first coordinate, and a second coordinate substantially orthogonal to the first coordinate, and each of the first coordinate and the second coordinate is generated by averaging the optical flow over a set of at least one video frame.

In some implementations, the display of the at least one video file from the set of at least one video file includes a playback window and a highlight queue.

In some implementations, the instructions to cause the processor to calculate the plurality of anomaly scores include instructions to cause the processor to calculate the plurality of anomaly scores using a KNN machine learning algorithm.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory, processor-readable medium storing instructions to cause a processor to:

receive, from a requestor compute device, a request including a representation of at least one video camera from a plurality of video cameras;

in response to receiving the request, generate a set of at least one video file by:

retrieving a set of video clips associated with the at least one video camera from the plurality of video cameras and a time range, calculating, for each video camera from the plurality of video cameras, a plurality of anomaly scores based on a feature vector from a plurality of feature vectors generated for that video camera and associated with a first time period, selecting, for each video camera from the at least one video camera, a subset of video clips from the set of video clips for that video camera based on a comparison of anomaly scores from the plurality of anomaly scores for that video camera, and concatenating the subsets of video clips to generate the set of at least one video file;

send a signal to cause display of at least one video file from the set of at least one video file via the requestor compute device; and during a second time period subsequent to the first time period, remove or down-weight at least one feature vector from the plurality of feature vectors based on an age of the at least one feature vector.

2. The non-transitory, processor-readable medium of claim 1, wherein, for each video camera from the plurality of video cameras, the plurality of anomaly scores is calculated using a different anomaly model for that video camera.

3. The non-transitory, processor-readable medium of claim 1, further storing instructions to cause the processor to calculate, for each video camera from the plurality of video cameras, the plurality of anomaly for that video camera scores using a k-Nearest Neighbors (KNN) machine learning algorithm.

4. The non-transitory, processor-readable medium of claim 1, wherein the display of the at least one video file from the set of at least one video file includes a playback window and a plurality of thumbnail images.

5. The non-transitory, processor-readable medium of claim 1, wherein the request further includes a representation of a desired duration for the set of at least one video file.

6. A method comprising:

identifying, for each video camera from a plurality of video cameras, a representation of a set of feature vectors from a plurality of sets of feature vectors and associated with a time period, each feature vector from the plurality of sets of feature vectors including at least one of location data associated with an optical flow or age data associated with the optical flow;

calculating, for each video camera from the plurality of video cameras and based on the associated representation of the set of feature vectors from the plurality of sets of feature vectors for that video camera, at least one anomaly score from a plurality of anomaly scores;

receiving, from a requestor compute device and subsequent to the time period, a request including (1) a representation of at least one video camera from the plurality of video cameras and (2) a representation of a time range within the time period;

in response to receiving the request, generating a set of at least one video file by:

retrieving a set of video clips associated with the at least one video camera and the time range, selecting, for each video camera from the at least one video camera, a subset of video clips from the set of video clips for that video camera based on a comparison of the anomaly scores from the plurality of anomaly scores for that video camera, and concatenating the subsets of video clips to generate the set of at least one video file; and sending a signal to cause display of at least one video file from the set of at least one video file via the requestor compute device.

7. The method of claim 6, wherein the display of the at least one video file from the set of at least one video file includes a playback window and at least one of a highlight queue or a plurality of thumbnail images.

8. The method of claim 6, wherein each feature vector from the plurality of sets of feature vectors includes time data, and speed data, and is associated with a video region in which a moving person has been detected.

9. The method of claim 6, wherein:

each feature vector from the plurality of sets of feature vectors further includes a first coordinate and a second coordinate substantially orthogonal to the first coordinate, each of the first coordinate and the second coordinate being generated by averaging the optical flow over a set of at least one video frame.

10. The method of claim 6, wherein each video clip from the set of video clips has an associated duration of at least about 20 seconds.

11. An apparatus, comprising:

a processor; and a memory operably coupled to the processor, the memory storing instructions to cause the processor to:

identify, for each video camera from a plurality of video cameras, a representation of a set of feature vectors from a plurality of sets of feature vectors and associated with a first time period;

identify, for each set of feature vectors from the plurality of sets of feature vectors, a representation of an associated time within the first time period;

calculate, for each video camera from the plurality of video cameras and based on the representation of the set of feature vectors from the plurality of sets of feature vectors for that video camera, at least one anomaly score from a plurality of anomaly scores;

receive, from a requestor compute device and subsequent to the first time period, a request including (1) a representation of at least one video camera from the plurality of video cameras and (2) a representation of a time range within the first time period;

in response to receiving the request, generate a set of at least one video file by:

retrieving a set of video clips associated with the at least one video camera and the time range, selecting, for each video camera from the at least one video camera, a subset of video clips from the set of video clips for that video camera based on a comparison of the at least anomaly score from the plurality of anomaly scores for that video camera, and concatenating the subset of video clips to generate the set of at least one video file;

send a signal to cause display of at least one video file from the set of at least one video file via the requestor compute device; and update the plurality of sets of feature vectors during a second time period subsequent to the first time period, by removing at least one feature vector from the plurality of sets of feature vectors in response to detecting that a memory size limit of information has been reached.

12. The apparatus of claim 11, wherein the request further includes a representation of a desired duration for the at least one video file from the set of at least one video file.

13. The apparatus of claim 11, wherein the memory further stores instructions to cause the processor to update the plurality of sets of feature vectors during a third time period subsequent to the first time period, by one of removing or down-weighting at least one feature vector from the plurality of sets of feature vectors based on an age of the at least one feature vector from the set of feature vectors.

14. The apparatus of claim 11, wherein each feature vector from the plurality of sets of feature vectors includes location data, time data, and speed data, and is associated with a video region in which a moving person has been detected.

15. The apparatus of claim 11, wherein:

each feature vector from the plurality of sets of feature vectors includes location data associated with an optical flow, age data associated with the optical flow, a first coordinate, and a second coordinate substantially orthogonal to the first coordinate, each of the first coordinate and the second coordinate being generated by averaging the optical flow over a set of at least one video frame.

16. The apparatus of claim 11, wherein the display of the at least one video file from the set of at least one video file includes a playback window and a highlight queue.

17. The apparatus of claim 11, wherein the instructions to cause the processor to calculate the plurality of anomaly scores include instructions to cause the processor to calculate the plurality of anomaly scores using a k-Nearest Neighbors (KNN) machine learning algorithm.

18. The apparatus of claim 11, wherein each video clip from the set of video clips has an associated duration of at least about 20 seconds.

* * * * *

UNITED STATES PATENT AND TRADEMARK OFFICE
CERTIFICATE OF CORRECTION

| | |
|---|---|
| PATENT NO. | : 11,983,927 B1 |
| APPLICATION NO. | : 18/182922 |
| DATED | : May 14, 2024 |
| INVENTOR(S) | : John Peruzzi et al. |

It is certified that error appears in the above-identified patent and that said Letters Patent is hereby corrected as shown below:

On the Title Page

Item (54) and in the Specification, Column 1, Lines 1-2:
Please delete "METHODS AND APPARATUS TO PRODUCE ANAOMALOUS VIDEO HIGHLIGHTS" and replace with -- METHODS AND APPARATUS TO PRODUCE ANOMALOUS VIDEO HIGHLIGHTS --

Signed and Sealed this
Twenty-fifth Day of June, 2024

Katherine Kelly Vidal
*Director of the United States Patent and Trademark Office*